March 22, 1932.   M. KATZENBERGER   1,850,721

FLUID MOTOR

Filed Feb. 27, 1930

INVENTOR
MARTIN KATZENBERGER
BY
Eilers & Schaumberg
ATTORNEYS

Patented Mar. 22, 1932

1,850,721

UNITED STATES PATENT OFFICE

MARTIN KATZENBERGER, OF ST. LOUIS, MISSOURI

FLUID MOTOR

Application filed February 27, 1930. Serial No. 431,773.

This invention relates to improvements in fluid motors, and more particularly to improvements in the arrangement of vanes and means for varying the effective fluid-reaction surface of the vanes.

An object of the invention is to provide, in a fluid motor presenting variable reaction surface to the fluid stream, improved means for varying the effective reaction surface according to the speed of the motor, or according to the speed of the air stream with respect to the motor.

A further object is the provision of improved means for stabilizing the speed of fluid motors exposed to fluid currents of widely varying velocities.

A still further object is the provision of improved centrifugally-operated means for furling the wind vanes of a wind wheel, particularly a wind wheel adapted to rotate about a vertical shaft.

Yet another object of the invention is attained in the provision of means for uniformly furling the grouped vanes of a vertical wind wheel, whereby the angle of incidence of a given number of vanes may be changed independently of the remaining vanes of the same rotating element.

Still a further object of the invention is attained by the improved furling means to be described, in that any predetermined group of vanes in the wind wheel of my invention may be changed in incidence, relative to other vanes in the same wheel, the dynamic balance of the rotatable mass remaining unaltered as a result of furling, or change in incidence of certain of the vanes or blades.

An additional object of the invention is attained in the provision of wind vanes of improved section or camber adapted for use particularly in a vertical shaft wind wheel of the general type to be described, and which serve materially to increase the operating efficiency and starting torque of the wheel.

Figure 1:
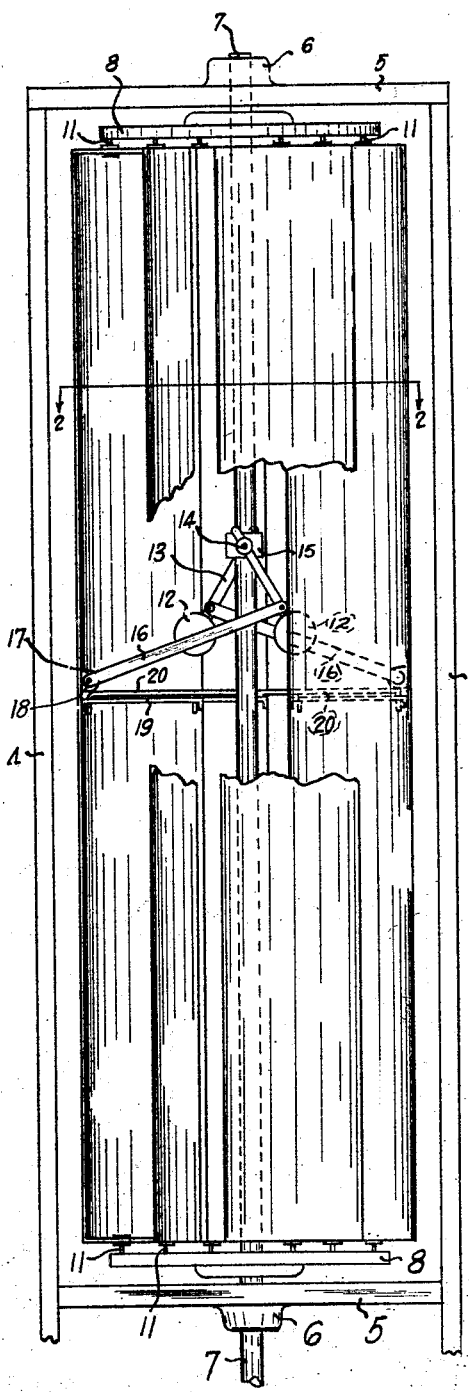
Figure 2:
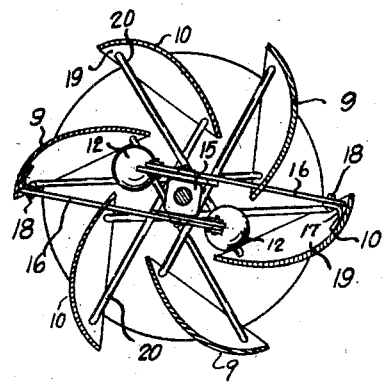
Figure 3:
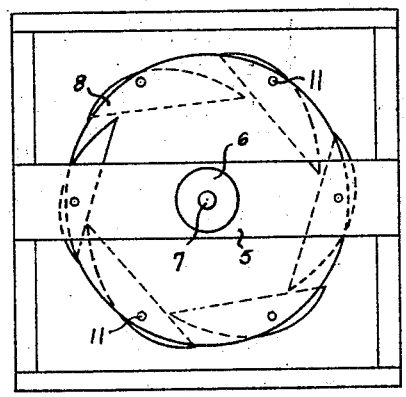

Further objects and advantages of the invention will appear from the following detailed description, considered in connection with the drawings, in which:

Fig. 1 is a side elevation of a fluid motor constructed as a wind wheel, and embodying the present invention, certain of the vanes having been broken away in this figure in order more clearly to show the automatic vane regulating mechanism; Fig. 2 is a transverse section along line 2—2 of Fig. 1, and Fig. 3 is a plan view of the device appearing in Fig. 1, and which may be considered as an end elevation, viewed from the top or bottom of the structure.

Referring now by characters of reference to the drawings, the present example of the invention is embodied in a vertical shaft wind wheel which may be mounted in any suitable framework consisting, for example, of side members 4, transversely of and at the ends of which are disposed cross pieces 5 which may serve to form, or carry in aligned registering relation, a pair of bearings 6 for a vertical shaft 7. The bearings 6 may be of the ordinary sleeve type or may be constituted by any of the usual anti-friction arrangements, such as ball or roller bearings. Any suitable mechanical expedient for taking care of end thrust, may be employed either in connection with one or both of the bearings 6, or elsewhere along the shaft 7.

Disposed in spaced, preferably parallel, relation near opposite ends of shaft 7, and in the same supporting frame work, are end plates 8, preferably of metal and keyed or otherwise secured to the shaft 7. If desired there may be one or more of the plates 8 or their equivalent disposed between the ends of the wheel, as may be dictated by the diameter, weight, etc., of the particular motor. The end plates serve as pivot members and supports for a plurality of vanes 9 and 10, each of the vanes being preferably of a uniform width throughout its length, constructed of sheet metal of a single thickness and cambered or curved irregularly, substantially as appears in Fig. 2. Each of the vanes is provided at its opposite ends with pivot pins 11 which may be socketed or otherwise journaled in the end plates 8.

The diameter of plates 8 is preferably so chosen with respect to the chord width of the vanes 9 and 10 that, with the pivots 11 disposed peripherally of the end plates (Fig. 3), the vanes 9 and 10 when approaching their closed position, will each tend to overlap an adjacent vane for a purpose hereinafter more clearly appearing. In the present example six vanes are employed, and they are related in two groups of three vanes to each group.

As noted above, the vanes are preferably formed of sheet metal of a uniform thickness to minimize the inertia of the rotating mass and to provide a substantial starting torque. As will appear from Figs. 2 and 3, the section of each of the vanes corresponds substantially to that of half of a pure streamlined body, and the vanes are mounted on the wheel in such a manner that both the concave and the convex sides of each vane serve as air-reaction surfaces, except when the vanes are nearly fully furled, when the air stream impinges to the greatest extent on the convex surfaces, (Fig. 3). As will clearly appear from Fig. 2, each of the vanes has its maximum curvature, i. e., is curved on the shortest radius, near the leading or outside edge. Proceeding transversely of the wing, the curvature decreases, being formed on a greater radius, proceeding toward the trailing edge of the element. It will appear that, with the vanes disposed in their open position, (Fig. 2), the leading edge of each vane is projected from the periphery of the wheel and the trailing edge of the vane retracted inwardly or toward the axis of rotation of the wheel. Due to the wide range of wind stream velocities encountered in most regions, it is necessary, when desirable that the wind wheel operate within a certain restricted range of speeds, to provide means for automatically furling the vanes, or changing the angle of incidence thereof, so as to tend to offset the greater air reaction effect due to higher wind velocities. To this end I have provided a structure which is capable of being opened and closed, automatically, according to the speed of the wheel.

By preference and as shown in the drawings, the automatic means for varying the angular setting of the vanes includes, for actuating purposes, a pair of centrifugal weight elements 12. Each of the weight elements is supported by an arm 13, the upper or outer end of which is pivoted as at 14 to a mounting collar such as a block 15, affixed lengthwise of the shaft 7 and secured to rotate therewith. In the present example the pivots 14 are disposed on opposite sides of the collar 15, and the arms 13 are spaced thereby in such a manner that each of the balls or weight elements 12 is capable of free movement, independent of the other, under the influence of centrifugal force, as the shaft 7 and vanes are rotated by wind pressure. Pivoted near the weighted end of each of the arms 13 is an arm 16, the opposite or outer end of which is shown as pivoted to one of the vanes 9 or 10. One of the blades 9 and one of the blades 10 is each provided with an internally extending projection or ear 17 to which one of the arms is pivoted by a pin 18. As will appear from Fig. 3, each of the vanes is pivoted for furling or adjusting rotation about a longitudinal axis near the transverse center of the vane. As will appear from Fig. 2, the ears 17 and pivot pins 18 are disposed in each case, near the outer or leading edge of the vane. As the weight elements 12 are lifted under centrifugal influence, the obvious effect will be to rotate the pair of vanes connected thereto, in such a manner as to retract the leading edges of the vanes by rotating them counterclockwise about their own axes, as viewed in Fig. 2. The weight elements 12 being of equal mass and the arms 16 of equal length, the vanes 9 and 10 on opposite sides of the wheel, will therefore be presented at equal angles of incidence to the air stream.

Adjustment of the angle of incidence of the remaining vanes is effected by interconnecting members serving operatively to associate each of the blades of the similarly numbered group.

The particular curvature or camber of the vanes is preserved, and the vanes transversely reinforced by means of cross ribs 19 which, in the case of a vertical shaft wind wheel, will be disposed in substantially horizontal planes. The ribs 19 serve the further purpose of providing a bearing surface for connecting rods 20, the ribs being perforated near their opposite ends to receive angulately disposed end portions of the connecting rods, as will appear in Fig. 1.

As will appear from Fig. 2, and as heretofore noted, the present example of the invention showing a wheel consisting of six vanes, is so constructed that the vanes fall into two groups of three vanes each, the vanes of the first group being designated as 9 and those of the second group, by the reference numeral 10. The preferred arrangement consists in directly actuating one of the vanes, for example the vane 10 appearing in the extreme right of the figure, by means of the link or arm 16 which is connected to the weight arm of the governor, so that this particular vane or blade is retracted as the speed of the wheel increases. Pivotally engaging the outer extremity of a rib 19 on this vane, is one of the connecting rods 20 which extends partly across the wheel to the next vane of the same group. It will appear that the rod 20 extends from the leading edge of the live vane, to the trailing edge of the next blade of the same group proceeding clockwise of the wheel (Fig. 2). This actuated vane serves in turn to furl or set the next vane of the same group, through a similar connecting rod 20 extending from its pivot near the leading edge of one vane, to a pivot point near the trailing edge of the succeeding vane of the same group. Since the rods 20 are each pivotally connected at substantially equal distances from the axes of the several vanes, it will appear that each of the vanes of a given group will be moved through substantially the same angle upon a given centrifugal movement of the weight 12 corresponding to that particular group of vanes.

For convenience of description, reference to the means of regulating the vanes, by the governor, has been made to only one of the groups. It will appear as obvious that the remaining group of vanes 9 are similarly interconnected by rods 20 and actuated by the opposite governor weight in such a manner that upon a given increase or decrease of wheel speed, all of the vanes will be substantially similarly adjusted and to the same extent. It will further appear that the arrangement is not restricted to any particular number of groups of vanes, each of which consists of any particular number of vanes, but that the vanes may be varied greatly in area and number, as well as in aggroupment, as may be practically determined by the size of the wheel and its operating conditions.

It will clearly appear from the preceding description of the example illustrated, that whatever the angle of incidence of the blades, when the wheel is at rest, as appears in Fig. 2, the rotating mass of the wheel assembly is balanced, or practically so, at all times. It will further appear that the range of movement of the centrifugal elements may be so determined as to provide for the operation of the wind wheel over almost any range of speeds according to average wind velocities and according to connected load. In the present example the vanes are shown in Fig. 2 in the position assumed when the wheel is at rest, and are shown substantially fully furled in Fig. 3, in which position it will appear that the leading edges of the vanes of one group are brought into overlapping relation to the vanes of the other group, in such a manner that the periphery of the wheel is practically closed upon itself. At such time, however, the exterior surfaces of the vanes still function to a certain extent as air-reaction surfaces so that rotation of the wheel continues even after the centrifugal elements are moved to their upper or outer limit.

The device described has been found by experiment to provide a wind wheel which is well balanced, which is readily responsive in its adjustments to changes in velocity of the fluid stream, and which may be set up to operate with a minimum variation from a predetermined range of speeds regardless of extreme fluctuations in the velocity of the actuating fluid.

While the invention has been described by making specific reference to a particular example, the disclosure is to be understood in an illustrative and not in a limiting sense. It will appear as obvious to those skilled in the art that, for example, a single centrifugal element or any desired number thereof may be employed to effect furling adjustments, and that other types of devices may be employed to accomplish this purpose; further that changes in addition to those enumerated may be made in the parts and their arrangement without departing from the full intended scope of the invention, as defined by the appended claims.

I claim:

1. In a wind motor, a wheel, a vertical wheel shaft, a plurality of vanes, each of uniform width and progressively decreasing curvature from leading to trailing edge, the vanes being disposed peripherally of the wheel and arranged for furling movement about axes substantially parallel to said shaft, brace plates disposed transversely of the vanes and arranged to prevent full closure of the circumference of the wheel when furled, the plates and vanes coacting to provide air passages into the wheel substantially tangent thereto, closure plates at the ends of the wheel, a centrifugal element carried by said shaft within the wheel, and operatively connected to one of said vanes, and means operatively connecting the centrifugally actuated vane, to other of said vanes.

2. In a wind motor of vertical shaft type, a wheel, a shaft therefor, a plurality of vanes disposed peripherally of the wheel and pivoted for rotation about substantially parallel axes, plate numbers at the opposite ends of the wheel, forming end supports for the vanes, and serving substantially as closures for the ends of the wheel, said vanes each being of a uniform width and progressively decreasing curvature from leading edge to trailing edge, and disposed in groups, the vanes of each group being operatively interconnected for purposes of furling, combined braces and stop members, disposed transversely of the vanes and arranged to prevent furling movement thereof such that the wheel becomes fully closed, and centrifugal elements, carried by said shaft within the wheel and operatively associated with the vanes for controlling their angle of incidence.

3. In a wind motor, a wind wheel, a vertical shaft therefor, vanes each formed of a single thickness of metal, curved on a progressively increased radius from leading edge to trailing edge, the vanes being pivotally mounted, for adjusting rotation, near the periphery of said wheel, plates at the opposite ends of the wheel, forming end supports for said vanes, and serving as closures for the ends of the wheel, said vanes being disposed in groups, with each vane of one group disposed adjacent to a vane of another group the adjacent vanes being so disposed that the leading edge of one overlies, in spaced relation, the trailing edge of another, as the vanes are brought near one limit of their rotation; a governor carried by the wheel shaft, and operatively connected to a vane of one group, connecting rods pivoted to and operatively connecting a centrifugally actuated vane of one group with other vanes of the same group; webs extending across the inner faces of the vanes, and constituting stiffening members for the vanes, journals for said connecting rods, and stops for preventing full closure of the wheel by the vanes, and a second governor carried by the shaft, and operatively associated in controlling relation to the vanes of another group, said governor being carried by the wheel shaft and within the periphery of the wheel, irrespective of the adjusted position of said vanes.

4. In a vertical shaft wind motor, a wind wheel, including spaced end plates substantially closing the ends of the wheel, a plurality of vanes mounted peripherally of the wheel and interconnected in groups, for adjusting purposes, each of said vanes being journaled in said end plates for rotation about an axis substantially parallel to the wheel shaft; each of said vanes being of uniform width and thickness, cambered transversely and having a progressively increasing radius of curvature from the leading edge to the trailing edge thereof; a rib disposed transversely of and extending substantially across each vane, the ribs serving to restrict the adjusting movement of the vanes as they approach positions tending to close the periphery of the wheel, a plurality of centrifugal governors pivotally mounted on the wheel shaft and within the wind wheel, and capable of independent actuation, a vane actuating link for each of said governors, each link being pivoted at one end to the governor and at its opposite end to one of the vanes of a given group, and connecting rods journaled in said ribs and disposed transversely of the wheel, whereby operatively to connect each of the vanes of each group with the others of said group, the governor and connecting rods of each group being adapted, responsively to speed changes of the wheel, to vary the angle of incidence of the vanes of a given group, with respect to the air stream.

MARTIN KATZENBERGER.